(12) United States Patent
Kalbande et al.

(10) Patent No.: US 12,350,612 B2
(45) Date of Patent: Jul. 8, 2025

(54) MULTIPLE THREADED CONNECTOR FOR FILTER

(71) Applicant: Cummins Filtration IP, Inc., Columbus, IN (US)

(72) Inventors: Nikhil Manohar Kalbande, Cookeville, TN (US); Ismail C. Bagci, Cookeville, TN (US); Kevin C. South, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

(21) Appl. No.: 18/758,193

(22) Filed: Jun. 28, 2024

(65) Prior Publication Data

US 2024/0350951 A1 Oct. 24, 2024

Related U.S. Application Data (60) Division of application No. 17/371,507, filed on Jul. 9, 2021, now Pat. No. 12,083,459, which is a
(Continued)

(51) Int. Cl.
*B01D 35/30* (2006.01)

(52) U.S. Cl.
CPC ...... *B01D 35/306* (2013.01); *B01D 2201/342* (2013.01); *B01D 2201/4092* (2013.01)

(58) Field of Classification Search
CPC ............ B01D 35/306; B01D 2201/342; B01D 2201/4092; B01D 2201/302; B01D 27/08;
(Continued)

(56) References Cited

U.S. PATENT DOCUMENTS

| 3,540,594 A | 11/1970 | Sanderson et al. |
| 5,443,138 A * | 8/1995 | Bedi ................... F01M 11/0458 123/196 R |
| 5,762,671 A | 6/1998 | Farrow et al. |
| 2011/0132829 A1 | 6/2011 | Tucker et al. |
| 2013/0220914 A1 | 8/2013 | Hawkins et al. |

(Continued)

FOREIGN PATENT DOCUMENTS

| CN | 1649659 A | 8/2005 |
| CN | 101198389 A | 6/2008 |

(Continued)

OTHER PUBLICATIONS

International Search Report and Written Opinion issued for PCT Application No. PCT/US2020/012201 PCT/US2020/012201, issued Mar. 4, 2020, 9 pages.

(Continued)

*Primary Examiner* — Waqaas Ali
(74) *Attorney, Agent, or Firm* — Foley & Lardner LLP (57) ABSTRACT

A filter assembly comprising a housing with a first coupling member formed in a housing first end of the housing. The filter assembly further comprises a filter head with a first thread formed on a surface thereof. The filter assembly further comprises an adapter. The adapter includes a first adapter end, a second adapter end, and an annular portion. The annular portion is disposed between the first adapter end and the second adapter end. A first axial wall extends from the annular portion axially towards the first adapter end. The first axial wall includes a third coupling member configured to engage the second coupling member on the filter head. A second axial wall extends from the annular portion axially towards the second adapter end. The second axial wall includes a fourth coupling member configured to engage a first coupling member on the housing.

20 Claims, 7 Drawing Sheets

Related U.S. Application Data continuation of application No. PCT/US2020/012201, filed on Jan. 3, 2020.

(60) Provisional application No. 62/791,154, filed on Jan. 11, 2019.

(58) Field of Classification Search
CPC ...... B01D 27/148; B01D 35/30; F01M 11/03; F02M 37/42
See application file for complete search history.

(56) References Cited

U.S. PATENT DOCUMENTS

| | | |
|---|---|---|
| 2013/0327696 A1 | 12/2013 | Bagci et al. |
| 2014/0110321 A1 | 4/2014 | Bertin et al. |
| 2014/0183118 A1 | 7/2014 | Marks |
| 2017/0361253 A1 | 12/2017 | Baxter |

FOREIGN PATENT DOCUMENTS

| | | |
|---|---|---|
| CN | 201696113 | 1/2011 |
| CN | 201714454 U | 1/2011 |
| CN | 202087112 U | 12/2011 |
| CN | 202590493 U | 12/2012 |
| CN | 103362707 A | 10/2013 |
| CN | 104755741 A | 7/2015 |
| CN | 105517684 A | 4/2016 |
| CN | 105764589 A | 7/2016 |
| CN | 106170329 A | 11/2016 |
| CN | 106693499 A | 5/2017 |
| CN | 106988939 A | 7/2017 |
| CN | 207483475 U | 6/2018 |
| CN | 108367214 A | 8/2018 |
| EP | 0 702 144 A2 | 3/1996 |
| TW | 200934573 A | 9/2009 |
| WO | WO-2015/156760 A1 | 10/2015 |
| WO | WO-2017/001067 A1 | 1/2017 |
| WO | WO-W2017/001067 A | 1/2017 |
| WO | WO-2017/153210 A1 | 9/2017 |

OTHER PUBLICATIONS

Office Action issued for Chinese Patent Application No. CN 202080008493.7 issued Mar. 8, 2022, 8 pages.

* cited by examiner

FIG. 5C ic # MULTIPLE THREADED CONNECTOR FOR FILTER

CROSS-REFERENCE TO RELATED PATENT APPLICATION

The present application is a divisional application based on U.S. patent application Ser. No. 17/371,507, filed Jul. 9, 2021 which is a continuation of PCT Application No. PCT/US2020/012201, filed Jan. 3, 2020, which claims the benefit of priority to U.S. Provisional Patent Application No. 62/791,154, filed Jan. 11, 2019. The contents of these applications are incorporated herein by reference in their entirety.

TECHNICAL FIELD

The present application relates generally to fluid filtration systems. Him

BACKGROUND

Internal combustion engines generally combust a mixture of fuel (e.g., diesel, gasoline, natural gas, etc.) and air. Prior to entering the engine, the fuel is typically passed through a filter cartridge to remove particulate matter (e.g., dust, metal particles, debris, etc.) from the fuel prior to combustion. Similarly, lubricant or lube (e.g., engine oil) provided to the engine may also be passed through a filter cartridge so as to remove particulate matter from the lube before communicating to the engine. The fuel or oil may include water, which may accumulate in the filter and may have to be removed.

Various filter assemblies generally comprise a nut plate positioned on an end of a housing of the filter assembly, with the nut plate providing a mechanism for coupling of a filter head to a first end of the housing of the filter assembly, or coupling of a cover or bowl to a second end of the filter housing. Such nut plates introduce additional parts into the filter assembly and may increase manufacturing complexity and manufacturing cost of such filters. Additionally, the filter is configured for a rotatable and detachable connection to the head and/or bowl, by way of threaded connections. Consequently, larger shell diameters and increases in wall thickness can prove to be very challenging for the shell suppliers to adapt to, and an alternate design option of roll threading to accommodate these changes is relatively expensive.

SUMMARY

Various embodiments provide for a filter assembly comprising a housing defining an internal volume. The housing comprises a first coupling member formed in a housing first end of the housing. The filter assembly further comprises a filter head. The filter head comprises a first thread formed on a surface thereof. The filter assembly further comprises an adapter. The adapter includes a first adapter end, a second adapter end disposed axially away from the first adapter end, and an annular portion. The annular portion is disposed between the first adapter end and the second adapter end. The annular portion includes at least one opening formed in the annular portion. The at least one opening configured to allow fluid therethrough. A first axial wall extends from the annular portion axially towards the first adapter end. The first axial wall includes a third coupling member configured to engage the second coupling member on the filter head so as to removably couple the adapter and the filter head. A second axial wall extends from the annular portion axially towards the second adapter end. The second axial wall includes a fourth coupling member configured to engage a first coupling member on the housing so as to removably couple the adapter and the housing.

Various other embodiments provide for an adapter. The adapter includes a first adapter end, a second adapter end disposed axially away from the first adapter end, and an annular portion. The annular portion is disposed between the first adapter end and the second adapter end. The annular portion includes at least one opening formed in the annular portion. The at least one opening configured to allow fluid therethrough. A first axial wall extends from the annular portion axially towards the first adapter end. The first axial wall includes a first coupling member configured to engage a second coupling member on a filter head so as to removably couple the adapter and the filter head. A second axial wall extends from the annular portion axially towards the second adapter end. The second axial wall includes a third coupling member configured to engage a fourth coupling member on a housing so as to removably couple the adapter and the housing.

Various other embodiments provide for an adapter. The adapter includes a first adapter end, a second adapter end disposed axially away from the first adapter end, and an annular portion. The annular portion is disposed between the first adapter end and the second adapter end. The annular portion includes at least one opening formed therein. The at least one opening is configured to allow fluid therethrough. A first axial wall extends from the annular portion axially towards the first adapter end. The first axial wall includes a first coupling member configured to engage a second coupling member on a filter head so as to removably couple the adapter and the filter head. A second axial wall extends from the annular portion axially towards the second adapter end. The second axial wall includes a third coupling member configured to engage a fourth coupling member on a nutplate so as to removably couple the adapter and the nutplate.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Embodiments described herein relate generally to a system and method for securing a filter cartridge to a filter head using a multiple connecting-point adapter (e.g., a multiple threaded connector). In some embodiments, the adapter includes an internally facing threaded connector and an outwardly facing threaded connector to allow for a filter head having a wide interface diameter (e.g., wide-mouthed, larger than a standard filter cartridge, etc.) to receive a standard filter cartridge (e.g., a diameter that is less than the wide interface diameter). As used herein, the term "filter cartridge" refers to a filter element disposed within a complementary filter housing. As used herein, the term "standard filter cartridge" refers to snap-fit, spin-on, or other filter cartridges that are commonly used in the field, for example, a 2¼-12 UNS nutplate thread filter cartridge. However, the adapter is configured to have a wide variety of threaded interfaces and interface diameters to allow for a wide variety of filter cartridges to interface with a wide variety of filter heads. As will be appreciated, but for the adapter, the standard filter cartridge would be unable to engage and couple with the wide interface diameter of the filter head. Beneficially, the adapter allows for the use of a standard (e.g., smaller) diameter filter cartridge to be installed within the wide interface filter head without having to swap the filter head to a smaller interface that matches the standard diameter filter cartridge. In some embodiments, the filter head may have a smaller diameter than the filter cartridge and the adapter is configured to interface the larger diameter filter cartridge with the filter head.

Embodiments of the filter assembly described herein comprise an adapter that includes an interior facing coupling member for securing the adapter to a filter head and an exterior facing coupling member to secure the adapter to a filter cartridge without the use of a threaded connection directly between the filter cartridge and the filter head. The adapter can include both male and female coupling members and may provide benefits including, for example: (1) allowing coupling of a filter cartridge with a first diameter to a filter head with a second, larger, diameter, thereby allowing any filter cartridge to be used in a wide-interface filtration system; (2) ensuring proper sealing between the filter head and filter cartridge through scaling points between the adapter and the filter head and the adapter and the filter cartridge; (3) providing a wide variety of locking mechanisms or surfaces on the adapter to allow for interface with the filter head and filter cartridge; and (4) reducing a manufacturing cost of assembly of the filter assembly by reducing the number of parts included in the filter assembly and allowing flexibility in the usable housing types.

Figure 1:
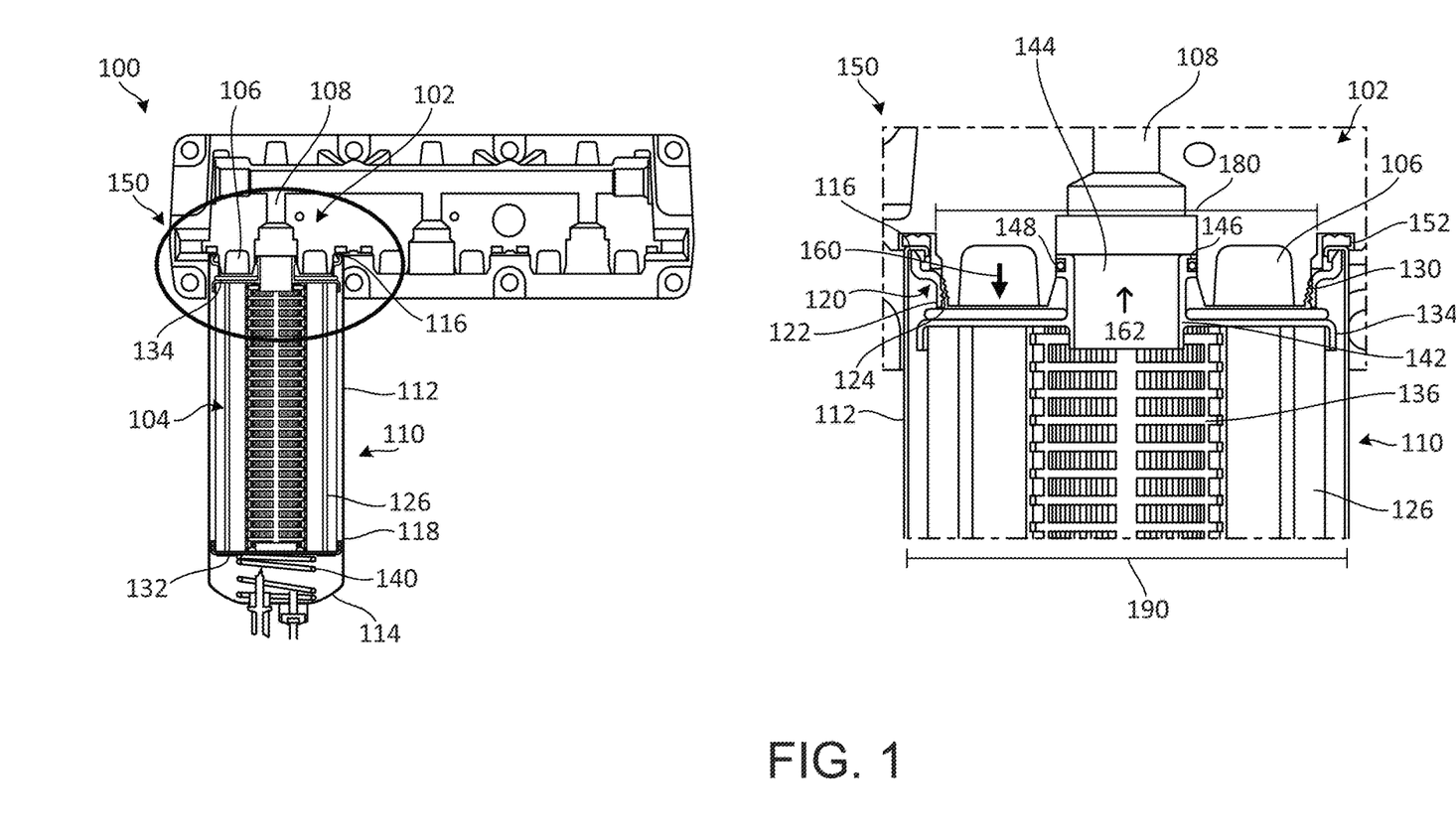
FIG. 1 shows cross-sectional front side views of a filtration system, according to an example embodiment.

FIG. 1 shows cross-sectional front side view of a filtration system 100 and a portion 150 of the filtration system 100, according to an example embodiment. Notably, the filtration system 100 includes a wide diameter nutplate 120 secured to the wide (e.g., larger diameter than a standard) filter cartridge 110 that allows the filter cartridge 110 to be secured directly to the filter head 102. The filter head 102 includes an inlet 106 that provides unfiltered fluid 160 to the filter cartridge 110 and an outlet 108 to receive filtered fluid 162 from the filter cartridge 110. While the filtration system 100 is shown as an outside-in filtration system, in some embodiments, the filtration system 100 may be an inside-out filtration system. The filter cartridge 110 includes a housing 112 and a filter element 104 disposed within an interior space 118 of the housing 112. In some embodiments, a coil spring 140 is disposed within the housing 112 and is suitably engaged with the filter cartridge 110 to bias the filter cartridge 110 into engagement with the nutplate 120.

The housing 112 includes a first housing end 114 and a second housing end 116. A nutplate 120 (or similar feature) is coupled to the second housing end 116 and is configured to engage the filter head 102. The housing 112 has a housing diameter 190 that is greater than the diameter of a standard filter cartridge. In some embodiments, the nutplate 120 is coupled to an end of the filter element 104. The nutplate 120 includes a threaded sleeve 122 having inwardly facing threads 124 for threadably connecting the filter cartridge 110 to a threaded member 130 of the filter head 102. The threaded sleeve 122 would be disposed at a sleeve diameter 180 and the threaded member 130 would be disposed at a head diameter along the filter head 102 that is substantially equal to the sleeve diameter 180. As will be appreciated, the sleeve diameter 180 is less than the housing diameter 190 as the housing 112 is larger to accommodate the larger filter head 102. A gasket can be provided in a groove 152 in the filter head 102 adjacent an end of the nutplate 120 to form a seal between the filter cartridge 110 and the filter head 102 to prevent fluid leakage from the filter cartridge 110 to outside the filter cartridge 110.

The filter element 104 includes a first endplate 132, a second endplate 134, and filter media 126 that extends axially between the first endplate 132 and the second endplate 134. A central cavity 136 is disposed within the filter media 126. The sleeve 142 is generally hollow and defines a fluid flow passageway 144 (e.g., flow passage) through the second endplate 134. The passageway 144 is in fluid communication with the central cavity 136 and the outlet 108. A seal member 148 is suitably disposed on the sleeve 142 for sealing with the filter head 102 to seal filtered fluid from unfiltered fluid. In some embodiments, the sleeve 142 can include a radial outward facing groove 146 integrally formed in the sleeve 142 for receiving the seal, for example an O-ring seal, therein. As shown best in the portion 150 of the filtration system 100, the second endplate 134 includes a first structure in the form of a sleeve 142 extending upwardly therefrom in a direction away from the second endplate 134 and radially inward from the threaded sleeve 122.

Figure 2:
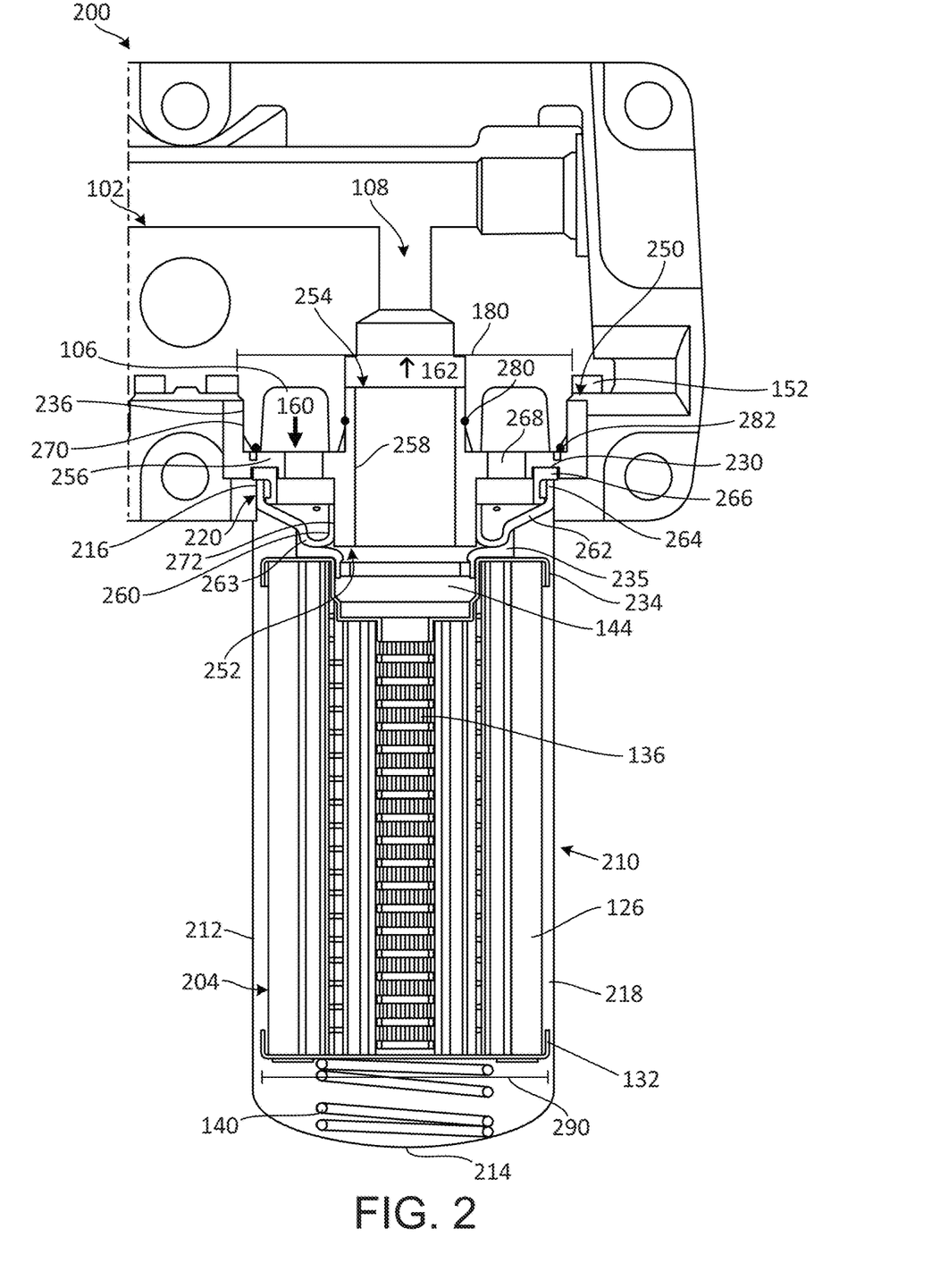
FIG. 2 shows a cross-sectional front side view of a filtration system of FIG. 1 with an adapter, according to an example embodiment.

Turning to FIG. 2, a cross-sectional view of a filtration system 200 with an adapter 250 is shown, according to an example embodiment. The filtration system 200 is similar to the filtration system 100 of FIG. 1. A difference between the filtration system 200 and the filtration system 100 is that the filter cartridge 210 has a smaller diameter than the filter cartridge 110 of FIG. 1 and the filter cartridge 210 has a different nutplate 220. Accordingly, like numbering is used to designate similar components between the filtration system 100 and the components of the filtration system 200. As will be readily apparent, but for the adapter 250, the filter cartridge 210 would be unable to engage and be secured to the filter head 102 for sealing (e.g., formed with a seal member 235) with the nutplate 220 to seal filtered fluid from unfiltered fluid.

The filtration system 200 includes the filter head 102 of FIG. 1 and a filter cartridge 210. The filter head 102 includes an inlet 106 that provides unfiltered fluid 160 through the adapter 250 to the filter cartridge 110 and an outlet 108 to receive filtered fluid 162 from the filter cartridge 210 through the adapter 250. The filter cartridge 210 includes a filter housing 212 and a filter element 204 disposed within an interior space 218 of the filter housing 212. The filter element 204 includes a first endplate 232, a second endplate 234, and filter media 126 that extends axially between the first endplate 232 and the second endplate 234. A central cavity 136 is disposed within the filter media 126. A fluid flow passageway 144 is defined through the second endplate 234 and is in fluid communication with the central cavity 136 and the outlet 108.

The filter housing 212 includes a first housing end 214 and a second housing end 216. The filter housing 212 has a housing diameter 290. A nutplate 220 (or similar feature) is coupled to the second housing end 216 and is configured to engage the adapter 250. The nutplate 220 includes a first engagement portion 260, a curved portion 263, a flanged portion 262, and a second engagement portion 264. The first engagement portion 260 is configured to couple the nutplate 220 to the second housing end 216 and to the adapter 250. The flanged portion 262 extends from the first engagement portion 260 towards the second engagement portion 264. As shown in FIG. 2, the flanged portion 262 extends out a diameter substantially similar to the housing diameter 290. The second engagement portion 264 may be configured to engage an external seal member 266 (or similar feature) and/or a groove 230 in the adapter 250 to form a seal between the nutplate 220 and the adapter 250. The curved portion 263 is positioned between the flanged portion 262 and the first engagement portion 260. The curved portion 263 is configured to couple with the seal member 235 positioned between the filter cartridge 210 and the nutplate 220.

The adapter 250 includes a second adapter end 252, a first adapter end 254, and an annular portion 256 disposed between the second adapter end 252 and the first adapter end 254. The annular portion 256 includes a plurality of openings 268 that place the inlet 106 in fluid communication with the interior space 218 of the filter housing 212. The annular portion 256 may include a groove 230 on a surface facing the second adapter end 252 that is configured to receive an external seal or portion of the filter cartridge 210 and/or a portion of the nutplate 220. An adapter sleeve 258 is centrally located and extends axially from the second adapter end 252 to the first adapter end 254 through the annular portion 256. The adapter sleeve 258 places the central cavity 136 and fluid flow passageway 144 in fluid communication with the outlet 108. The adapter 250 includes a first sealing surface 280 and a second sealing surface 282 to ensure that the adapter 250 is properly sealed with the filter head 102 and the filter cartridge 210, respectively, and to prevent fluid leakage from the filter cartridge 210 to outside the filter cartridge 210. The first sealing surface 280 is configured to form a seal between an external surface of the adapter sleeve 258 and the filter head 102. In some embodiments, the first sealing surface 280 may be a groove that is configured to receive an O-ring, a lathe cut gasket, or a similar configuration that is used to seal the filter head 102 with a complementary filter cartridge (e.g., the filter cartridge 110 of FIG. 1). The second sealing surface 282 is configured to form a seal between a surface of the annular portion 256 and the filter head 102. In some embodiments, the second sealing surface 282 may comprise a groove that is configured to receive an O-ring, a lathe cut gasket, or a similar configuration that is used to form a seal between the filter head 102 and a complementary filter cartridge.

The adapter 250 includes an internally facing second threaded connector 270 adjacent to the first adapter end 254 and an outwardly facing first threaded connector 272 adjacent to the second adapter end 252 to engage the filter head 102 and filter cartridge 210, respectively. The second threaded connector 270 extends axially from an outer perimeter of the annular portion 256 towards the first adapter end 254 and includes an inwardly facing threaded surface. The second threaded connector 270 is configured to threadably engage a complementary threaded head member 236 of the filter head 102. The first threaded connector 272 extends axially from an inner portion of the annular portion 256 towards the second adapter end 252 and includes an outwardly facing threaded surface. As shown in FIG. 2, the first threaded connector 272 extends along a portion of the adapter sleeve 258. The first threaded connector 272 is configured to engage a complementary first engagement portion 260 of the nutplate 220. In some embodiments, the first threaded connector 272 is configured to engage a complementary portion of the second endplate 234 to threadably engage the adapter 250 with the filter cartridge 210. As will be appreciated, the engagement of the first threaded connector 272 to the filter cartridge 210 and the second threaded connector 270 to the filter head 102 couples the filter cartridge 210 to the filter head 102.

Figure 3A:
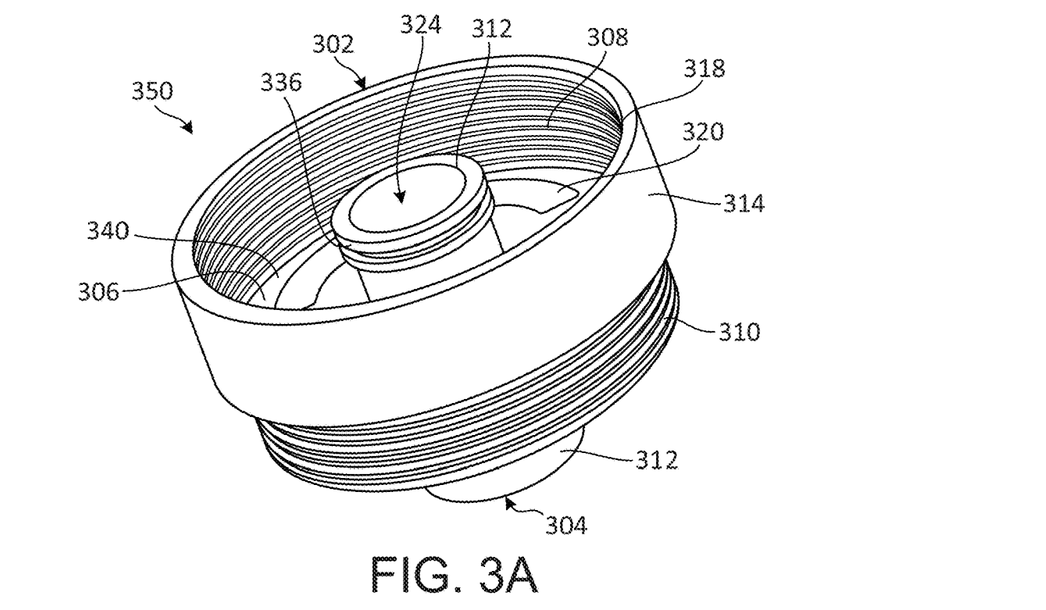
FIG. 3A shows a top perspective view of an adapter for a filtration system, according to an example embodiment.
Figure 3B:
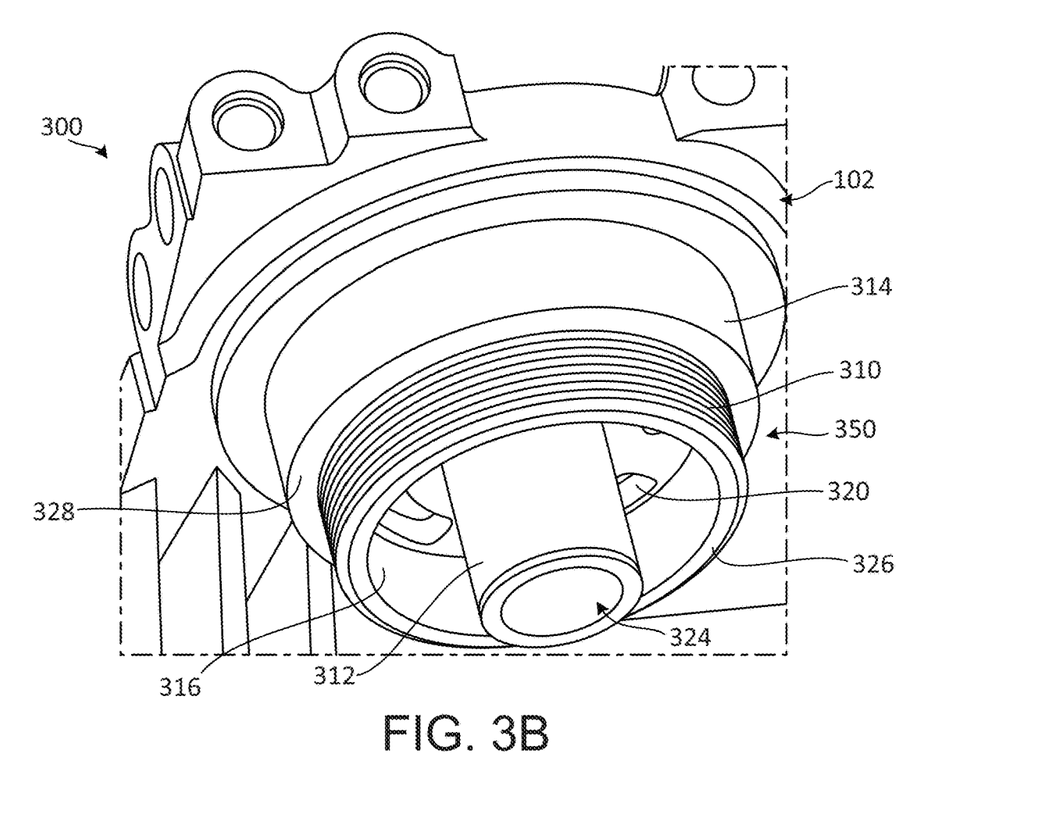
FIG. 3B shows a bottom perspective view of a filtration system with the adapter of FIG. 3A.
Figure 3C:
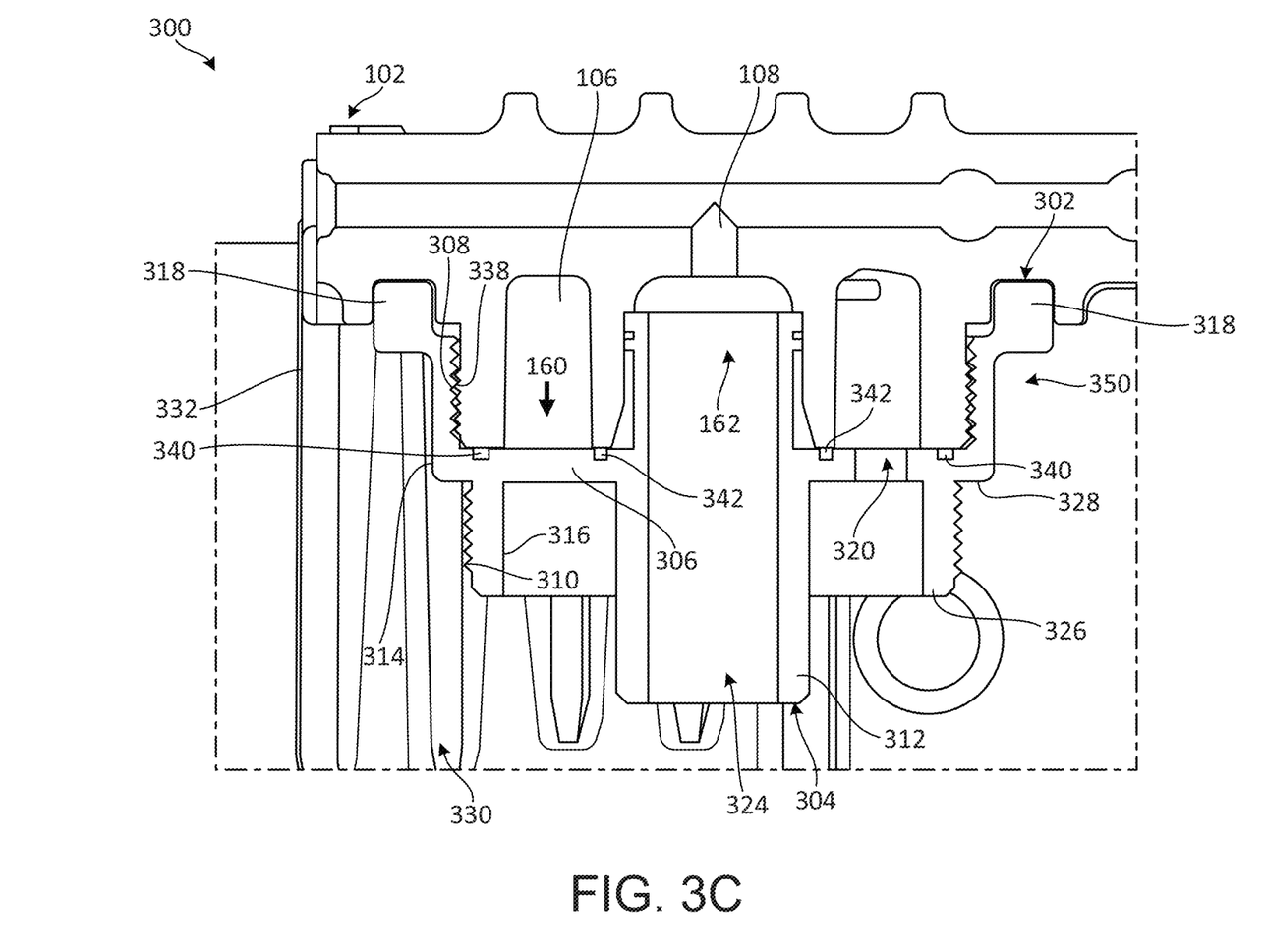
FIG. 3C shows a cross-sectional front side view of the filtration system and adapter of FIG. 3B.

Referring to FIGS. 3A-3C, an adapter 350 is shown, according to an example embodiment. The adapter 350 is similar to the adapter 250 of FIG. 2 and may be used in a filtration system 300 similar to the filtration system of FIG. 200. Accordingly, like numbering is used to designate similar components between the adapter 350 and filtration system 300 and the components shown in FIG. 2. A difference between the adapter 350 and the adapter 250 is the shape of the adapter 350.

The adapter 350 includes a first adapter end 302, a second adapter end 304, and an annular portion 306 disposed between the first adapter end 302 and the second adapter end 304. The annular portion 306 includes a plurality of openings 320 that place the inlet 106 in fluid communication with the interior space 330 of the filter housing 332. The annular portion 306 may include a groove on a surface facing the second adapter end 304 that is configured to receive an external seal or portion of the filter cartridge and/or nutplate-similar to the arrangement in FIG. 2. As shown in FIG. 3C, the annular portion 306 may include a first sealing groove 340 and a second sealing groove 342 disposed on a surface facing the first adapter end 302 that are configured to receive a seal member. In some embodiments, the first sealing groove 340 and/or the second sealing groove 342 are configured to receive an O-ring, a lathe cut gasket, or a similar configuration that is used to seal the filter head 102 with a complementary filter cartridge (e.g., the filter cartridge 110 of FIG. 1). The first sealing groove 340 is disposed radially outward a greater distance from a central axis 372 of the adapter 350 than the second sealing groove 342. The first sealing groove 340 and second sealing groove 342 may be disposed on opposite sides of the opening 320.

An adapter sleeve 312 is centrally located (e.g., along the central axis 372) and extends axially from the first adapter end 302 to the second adapter end 304 through the annular portion 306. The adapter sleeve 312 may include a sleeve groove 336 disposed on a top portion (e.g., adjacent the first adapter end 302) that is configured to receive a seal member and form a seal with a portion of the filter head 102. The adapter sleeve 312 places the central cavity 136 in fluid communication with the outlet 108 through a central sleeve opening 324 formed within the adapter sleeve 312. As shown in FIGS. 3A-3C, the adapter sleeve 312 extends past the second threaded connector 310. As shown in FIG. 3C, in some embodiments, the adapter sleeve 312 only extends from the annular portion 306 toward the second adapter end 304, or in other words, the adapter sleeve 312 does not include a top portion.

The adapter 350 includes an internally facing first threaded connector 308 adjacent to the first adapter end 302 and an outwardly facing second threaded connector 310 adjacent to the second adapter end 304 to engage the filter head 102 and a filter cartridge (not shown), respectively. The first threaded connector 308 extends axially from an outer perimeter of the annular portion 306 towards the first adapter end 302 and includes an inwardly facing threaded surface, a first top surface 318, a first bottom surface 328, and a substantially flat outwardly facing surface 314. As shown in FIG. 3C, the first top surface 318 may flare (e.g., protrude) radially outward. In some arrangements, however, the first top surface 318 is substantially flat (e.g., continuous with the axially extending surfaces). The first threaded connector 308 is configured to threadably engage a complementary threaded head member 338 of the filter head 102. The first top surface 318 and/or the outwardly facing surface 314 may be configured to form a seal with a portion of the filter head 102 when the first threaded connector 308 is engaged with the complementary threaded head member 338. The first bottom surface 328 may be configured to form a seal with a portion of the filter cartridge when the first threaded connector 308 is engaged with the complementary threaded head member 338.

The second threaded connector 310 extends axially from an inner portion of the annular portion 306 towards the second adapter end 304 and includes an outwardly facing threaded surface, a second bottom surface 326, and an inwardly facing surface 316. The second threaded connector 310 is configured to threadably engage a complementary threaded filter member of the filter cartridge. The second bottom surface 326 and/or the inwardly facing surface 316 may be configured to form a seal with a portion of the filter cartridge when the second threaded connector 310 is engaged with the complementary threaded filter member. As shown in FIG. 3B, the second threaded connector 310 is radially disposed away from the adapter sleeve 312. As will be appreciated, the engagement of the second threaded connector 310 with the filter cartridge and the first threaded connector 308 to the filter head 102 couples the filter cartridge to the filter head 102.

Figure 4A:
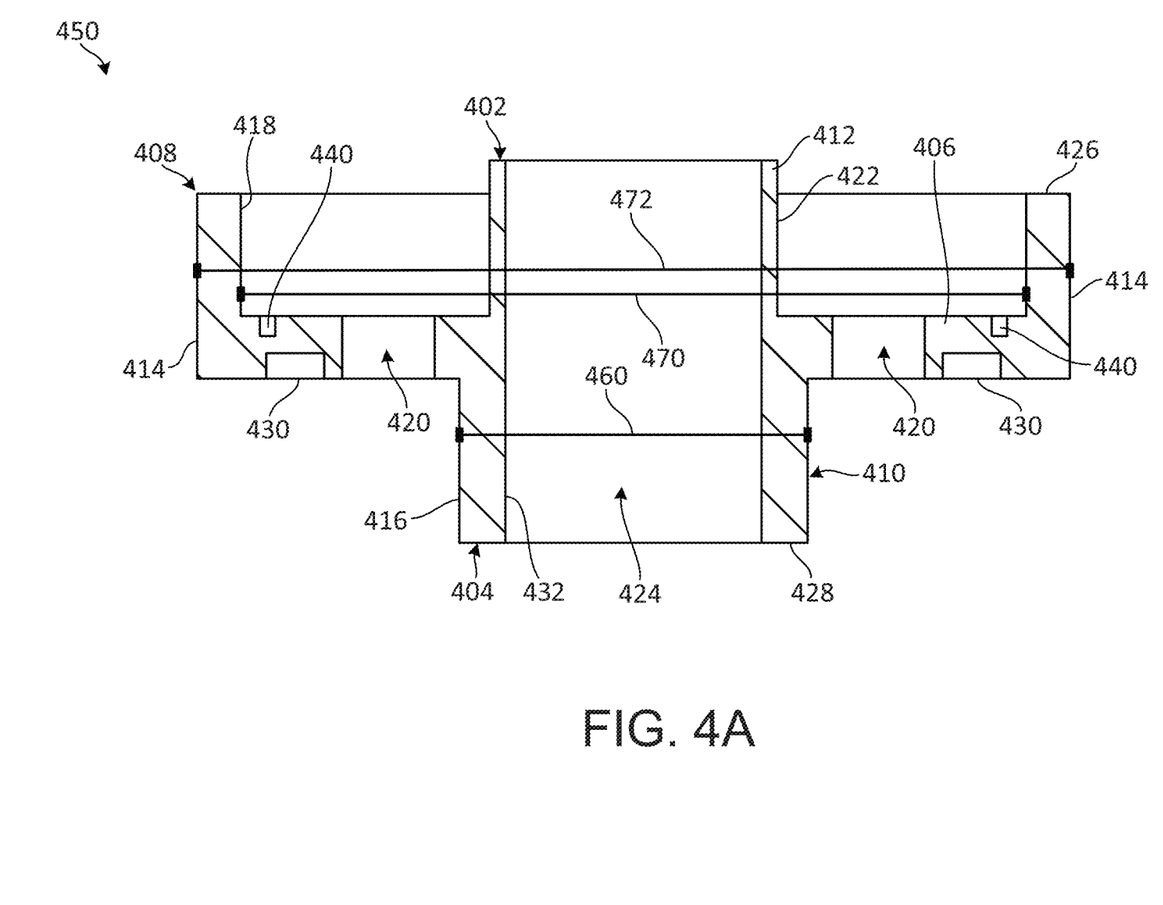
FIG. 4A shows a cross-sectional front side view of an adapter, according to an example embodiment.
Figure 4B:
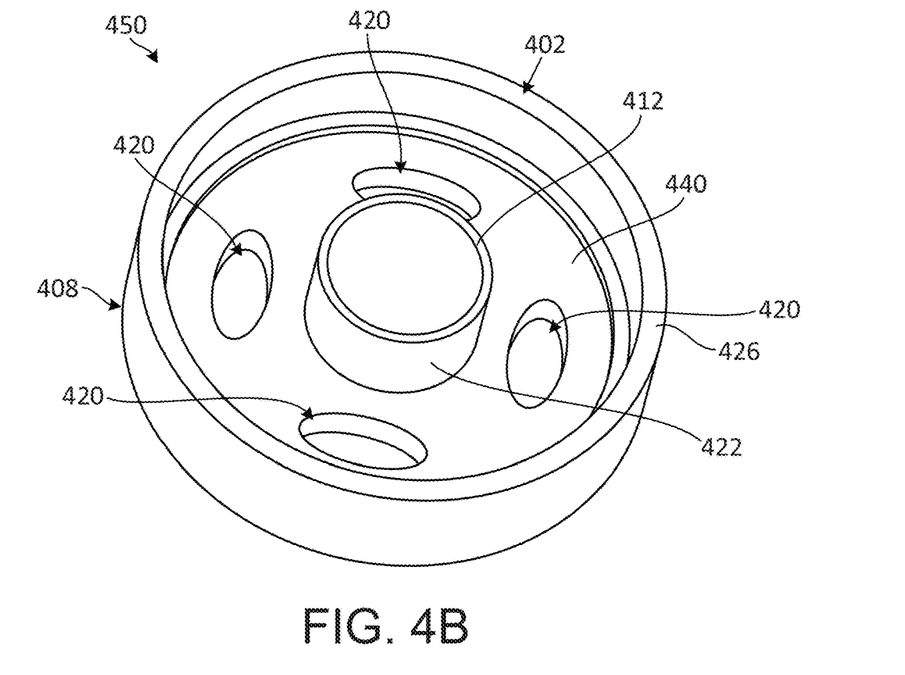
FIG. 4B shows a top perspective view of the adapter of FIG. 4A.
Figure 4C:
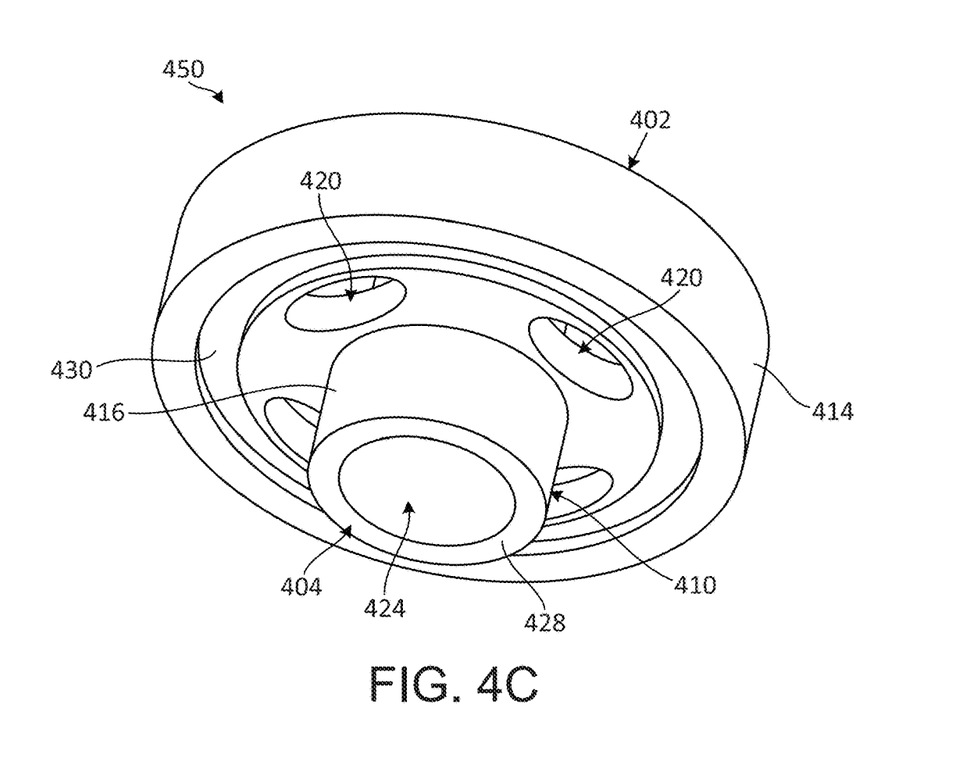
FIG. 4C shows a bottom perspective view of the adapter of FIG. 4B.

FIGS. 4A-4C show various views of an adapter 450 that can be used to interface a filter cartridge with a filter head. The adapter 450 is similar to the adapter 250 of FIG. 2 and the adapter 350 of FIGS. 3A-3C. Accordingly, like numbering is used to designate similar components between the adapter 450 and the components shown in FIGS. 2 and 3A-3C. A difference between the adapter 450 and the adapter 350 is the shape of the adapter 450 and the coupling surfaces.

The adapter 450 includes a first adapter end 402, a second adapter end 404, and an annular portion 406 disposed between the first adapter end 402 and the second adapter end 404. The annular portion 406 includes a plurality of openings 420 that place an inlet 106 in fluid communication with an interior space of a filter housing. The annular portion 406 may include a first sealing groove 440 and a second sealing groove 430 that are configured to receive a seal member. The first sealing groove 440 is disposed on a surface facing the first adapter end 402 and is configured to receive an external seal or portion of a filter housing or similar element. The second sealing groove 430 is disposed on a surface facing the second adapter end 404 and is configured to receive an external seal or portion of a filter cartridge or similar element. In some embodiments, the first sealing groove 440 and/or the second sealing groove 430 are configured to receive an O-ring, a lathe cut gasket, or a similar configuration that is used to seal the filter head 102 with a complementary filter cartridge (e.g., the filter cartridge 110 of FIG. 1). The first sealing groove 440 may be disposed radially outward a greater distance from a central axis of the adapter 450 than the second sealing groove 430. In some embodiments, the first sealing groove 440 and second sealing groove 430 are disposed on opposite sides of the opening 420.

An adapter sleeve 412 is centrally located and extends axially from the annular portion 406 toward the first adapter end 402. The adapter sleeve 412 may include a sleeve groove on an outer sleeve surface 422 that is configured to receive a seal member and form a seal with a portion of the filter head. The adapter sleeve 412 places a central cavity of a filter cartridge in fluid communication with an outlet through a central sleeve opening 424 formed within the adapter sleeve 412. As shown in FIGS. 4A-4C, the adapter sleeve 412 extends past a first axial wall 408 of the adapter 450.

The adapter 450 includes the first axial wall 408 and a second axial wall 410. The first axial wall 408 extends axially from an outer perimeter of the annular portion 406 towards the first adapter end 402. The first axial wall 408 includes a first internal surface 418, a first external surface 414, and a first end surface 426. The first internal surface 418 and the first external surface 414 extend axially upward (e.g., away from the second adapter end 404) and parallel to each other as they connect with the first end surface 426. As will be appreciated, the first internal surface 418 and/or the first external surface 414 may include a coupling member to couple the adapter 450 to a filter head. In some embodiments, the first internal surface 418 includes an internally facing (e.g., toward the central axis of the adapter 450) threaded coupling member. In some embodiments, the first end surface 426 is configured to form a seal with a filter head.

The second axial wall 410 extends axially from an interior portion of the annular portion 406 towards the second adapter end 404. The second axial wall 410 includes a second external surface 416 and a second end surface 428. The second internal surface 432 and the second external surface 416 extend axially downward (e.g., toward the second adapter end 404) and parallel to each other as they connect with the second end surface 428. While the second axial wall 410 is shown in FIGS. 4A-4C as a part of the adapter sleeve 412, in some embodiments, the second axial wall 410 is disposed radially away from the adapter sleeve 312 and includes a second internal surface. As will be appreciated, the second external surface 416 and/or the second end surface 428 may include a coupling member to couple the adapter 450 to a filter cartridge. In some embodiments, the second external surface 416 includes an externally facing (e.g., away from the central axis of the adapter 450) threaded coupling member. In some embodiments, the second end surface 428 is configured to form a seal with a filter cartridge.

As will be appreciated, the adapter 450 may be altered or configured to fit a wide range of filter cartridges and filter heads that utilize a wide variety of coupling members. Specifically, the first adapter end 402 may be configured with a coupling member on the first internal surface 418 to have a head engagement diameter 470 and/or a coupling member may be on the first external surface 414 to have a head engagement diameter 472 that is wider than the head engagement diameter 470. As will be appreciated, the "head engagement diameter" is the straight-line distance from the one point of engagement, through the central axis of the adapter 450, to another point of engagement. The second adapter end 404 may have a coupling member on the second external surface 416 with a filter engagement diameter 460. For example, the adapter 450 may have a first internal surface 418 of the first axial wall 408 that includes a threaded coupling member and a second external surface 416 of the second axial wall 410 that includes a snap-fit coupling member.

Figure 5A:
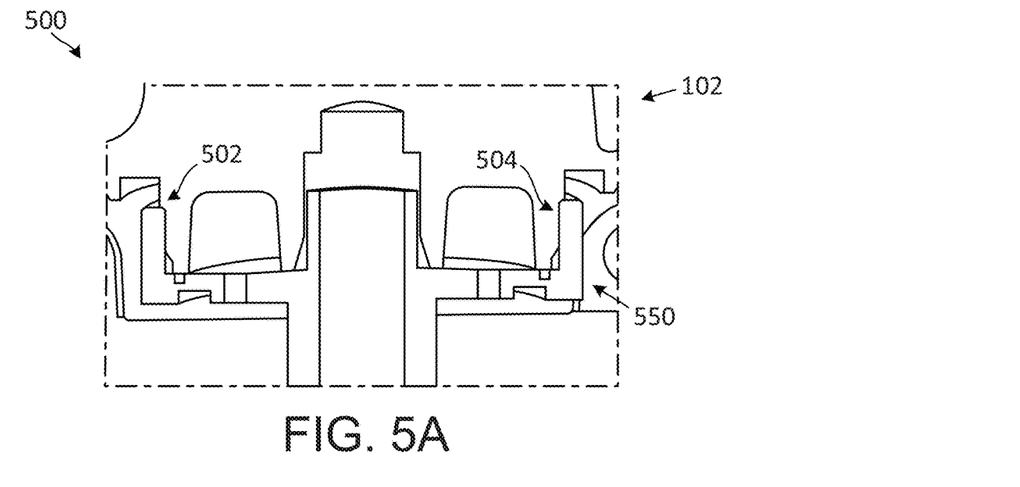
FIG. 5A shows a cross-sectional front side view of an adapter with a locking surface, according to an example embodiment.
Figure 5B:
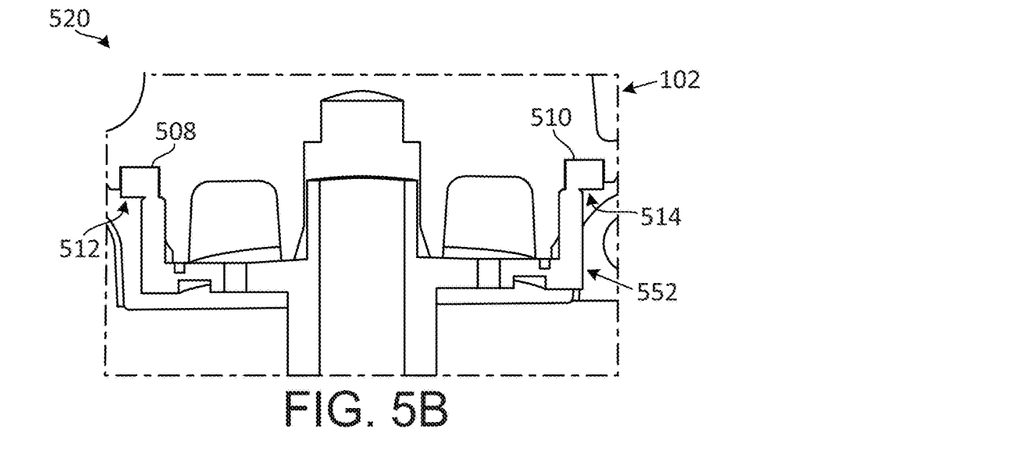
FIG. 5B shows a cross-sectional front side view of an adapter with a locking surface, according to another example embodiment.
Figure 5C:
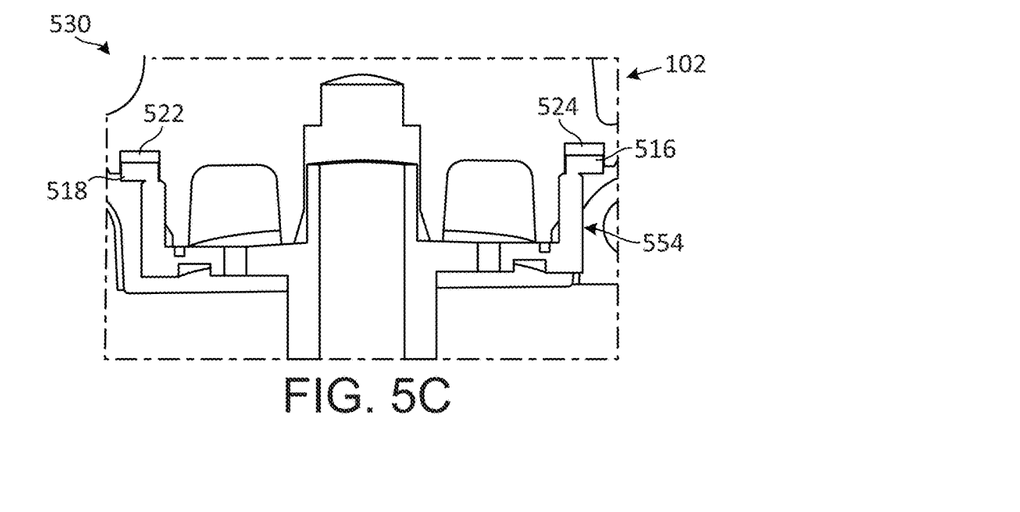
FIG. 5C shows a cross-sectional front side view of an adapter with a locking surface, according to yet another example embodiment.

FIGS. 5A-5C show different locking engagements for an adapter (550, 552, 554) in a filtration system. As will be readily apparent, the adapter may be any one of the adapters described in FIGS. 2-4C. FIG. 5A shows a filtration system 500 with an adapter 550 that is engaged to the filter head 102 at a first location 502 and a second location 504. The engagement is a radial engagement and may include use one or more screws or threaded members to secure the adapter 550 to the filter head 102. In some embodiments, a thread locker (e.g., permanent assembly requiring a heat gun or similar tool to disassemble).

FIG. 5B shows a filtration system 520 with an adapter 552 that includes a first radially protruding surface 508 and a second radially protruding surface 510 to engage the filter head 102 at a first location 512 and a second location 514, respectively. The engagement is an axial engagement and may include use one or more screws or threaded members to secure the adapter 552 to the filter head 102. In some embodiments, a thread locker (e.g., permanent assembly requiring a heat gun or similar tool to disassemble).

FIG. 5C shows a filtration system 530 with an adapter 554 that includes a first radially protruding surface 518 and a second radially protruding surface 516 to engage the filter head 102 at a first location 522 and a second location 524, respectively. The engagement is an annular engagement and may include use one or more screws or threaded members to secure the adapter 550 to the filter head 102. In some embodiments, a thread locker (e.g., permanent assembly requiring a heat gun or similar tool to disassemble).

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, various parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various example embodiments without departing from the scope of the concepts presented herein.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An adapter for a filter assembly, comprising:
a first adapter end;
a second adapter end disposed axially away from the first adapter end;
an annular portion disposed between the first adapter end and the second adapter end, the annular portion comprising:
at least one opening formed in the annular portion, the at least one opening configured to allow fluid therethrough;
a first axial wall that extends from the annular portion axially towards the first adapter end, the first axial wall comprising a first external surface, the first external surface comprising a first coupling member configured to engage a second coupling member on a filter head so as to removably couple the adapter and the filter head;
a second axial wall that extends from the annular portion axially towards the second adapter end, the second axial wall comprising a third coupling member configured to engage a fourth coupling member on a filter cartridge so as to removably couple the adapter and the filter cartridge; and an adapter sleeve that extends axially from the annular portion toward the first adapter end, a flow passage formed within the adapter sleeve configured to allow fluid therethrough.

2. The adapter of claim 1, wherein the first axial wall comprises a first internal surface and the first external surface, the first internal surface parallel to the first external surface, and the second axial wall comprises a second internal surface and a second external surface, the second internal surface parallel to the second external surface.

3. The adapter of claim 2, wherein the first internal surface of the first axial wall comprises the first coupling member and the second external surface of the second axial wall comprises the third coupling member.

4. An adapter for a filter assembly, comprising:
a first adapter end;
a second adapter end disposed axially away from the first adapter end;
an annular portion disposed between the first adapter end and the second adapter end, the annular portion comprising at least one opening formed in the annular portion, the at least one opening configured to allow fluid therethrough;
a first axial wall that extends from the annular portion axially towards the first adapter end, the first axial wall comprising a first external surface, the first external surface comprising a first coupling member configured to engage a second coupling member on a filter head so as to removably couple the adapter and the filter head; and
a second axial wall that extends from the annular portion axially towards the second adapter end, the second axial wall comprising a third coupling member configured to engage a fourth coupling member on a filter cartridge so as to removably couple the adapter and the filter cartridge,
wherein the first axial wall comprises a first internal surface and the first external surface, the first internal surface parallel to the first external surface, and the second axial wall comprises a second internal surface and a second external surface, the second internal surface parallel to the second external surface, and
wherein the first external surface of the first axial wall comprises the first coupling member and the second internal surface of the second axial wall comprises the third coupling member.

5. The adapter of claim 1, wherein the first coupling member is a threaded member configured to engage a complementary threaded member of the second coupling member of the filter head so as to threadedly couple the adapter and the filter head.

6. The adapter of claim 1, wherein the third coupling member is a threaded member configured to engage a complementary threaded member of fourth coupling member of the filter cartridge so as to threadedly couple the adapter and the filter cartridge.

7. The adapter of claim 4, further comprising an adapter sleeve that extends axially from the annular portion toward the first adapter end, a flow passage formed within the adapter sleeve configured to allow fluid therethrough.

8. An adapter for a filter assembly, comprising:
a first adapter end;
a second adapter end disposed axially away from the first adapter end;
an annular portion disposed between the first adapter end and the second adapter end, the annular portion comprising at least one opening formed in the annular portion, the at least one opening configured to allow fluid therethrough;
an adapter sleeve that extends axially from the annular portion toward the first adapter end, the adapter sleeve comprising a first sealing surface along an external surface of the adapter sleeve, the first sealing surface configured to form a first seal with a first surface of a filter head to prevent fluid leakage from the filter head;
a first axial wall that extends from the annular portion axially towards the first adapter end, the first axial wall comprising a first coupling member configured to engage a second coupling member on a filter head so as to removably couple the adapter and the filter head; and
a second axial wall that extends from the annular portion axially towards the second adapter end, the second axial wall comprising a third coupling member configured to engage a fourth coupling member on a nutplate so as to removably couple the adapter and the nutplate;
wherein the annular portion further comprises a second sealing surface facing the first adapter end, the second sealing surface configured to form a second seal with a second surface of the filter head to prevent fluid leakage from the filter head.

9. The adapter of claim 8, wherein the first sealing surface comprises a groove configured to receive a first sealing member.

10. The adapter of claim 9, wherein the second sealing surface comprises a groove configured to receive a second sealing member.

11. The adapter of claim 8, wherein the second axial wall comprises a portion of the adapter sleeve, and wherein the adapter sleeve includes an outwardly facing first threaded connector configured to engage a complementary first engagement portion of the nutplate.

12. The adapter of claim 11, wherein the first axial wall comprising an internally facing second threaded connector extending axially from an outer perimeter of the annular portion towards the first adapter end, the second threaded connector configured to threadably engage a complementary threaded head member of the filter head.

13. The adapter of claim 11, wherein the annular portion comprises a first sealing groove and a second sealing groove each disposed on a surface facing the first adapter end and configured to receive a seal member, the first sealing groove disposed radially outward a greater distance from a central axis of the adapter than the second sealing groove.

14. An adapter for a filter assembly, comprising:
a first adapter end;
a second adapter end disposed axially away from the first adapter end;
an annular portion disposed between the first adapter end and the second adapter end, the annular portion comprising at least one opening formed in the annular portion, the at least one opening configured to allow fluid therethrough;
a first axial wall that extends from the annular portion axially towards the first adapter end, the first axial wall comprising a first coupling member configured to engage a second coupling member on a filter head so as to removably couple the adapter and the filter head;
a second axial wall that extends from the annular portion axially towards the second adapter end, the second axial wall comprising a third coupling member configured to engage a fourth coupling member on a filter cartridge so as to removably couple the adapter and the filter cartridge; and an adapter sleeve that extends axially from the annular portion toward the first adapter end, a flow passage formed within the adapter sleeve configured to allow fluid therethrough, wherein the first axial wall comprises a first internal surface and a first external surface, the first internal surface parallel to the first external surface, and the second axial wall comprises a second internal surface and a second external surface, the second internal surface parallel to the second external surface, and wherein the first external surface of the first axial wall comprises the first coupling member and the second internal surface of the second axial wall comprises the third coupling member.

15. The adapter of claim 14, wherein the first axial wall comprises a first top surface and a first bottom surface, the first bottom surface configured to form a first bottom surface seal with the filter cartridge when the first coupling member engages the second coupling member.

16. The adapter of claim 15, wherein the second axial wall comprises a second top surface and a second bottom surface, the second bottom surface configured to form a second bottom surface seal with the filter cartridge when the third coupling member engages the fourth coupling member.

17. The adapter of claim 15, wherein the first top surface is configured to form a first top surface seal with the filter head when the first coupling member engages the second coupling member.

18. The adapter of claim 17, wherein the second axial wall comprises a second top surface and a second bottom surface, the second bottom surface configured to form a second bottom surface seal with the filter cartridge when the third coupling member engages the fourth coupling member.

19. The adapter of claim 2, wherein the first external surface of the first axial wall comprises the first coupling member and the second internal surface of the second axial wall comprises the third coupling member.

20. The adapter of claim 4, wherein the first coupling member is a threaded member configured to engage a complementary threaded member of the second coupling member of the filter head so as to threadedly couple the adapter and the filter head.

* * * * *